(12) United States Patent
Suga et al.

(10) Patent No.: US 10,756,342 B2
(45) Date of Patent: Aug. 25, 2020

(54) LITHIUM ION SECONDARY BATTERY

(71) Applicant: Envision AESC Japan Ltd., Zama-shi, Kanagawa (JP)

(72) Inventors: Sohei Suga, Zama (JP); Koichi Shinohara, Zama (JP); Kenji Ohara, Zama (JP); Toshihiro Horiuchi, Zama (JP); Masanori Aoyagi, Zama (JP); Junko Nishiyama, Zama (JP)

(73) Assignee: ENVISION AESC JAPAN LTD., Kanagawa (JP)

( * ) Notice: Subject to any disclaimer, the term of this patent is extended or adjusted under 35 U.S.C. 154(b) by 502 days.

(21) Appl. No.: 14/966,386

(22) Filed: Dec. 11, 2015

(65) Prior Publication Data

US 2016/0181606 A1 Jun. 23, 2016

(30) Foreign Application Priority Data

Dec. 18, 2014 (JP) .................................. 2014-256331

(51) Int. Cl.
*H01M 4/505* (2010.01)
*H01M 4/36* (2006.01)
(Continued)

(52) U.S. Cl.
CPC ........... *H01M 4/505* (2013.01); *H01M 4/364* (2013.01); *H01M 4/366* (2013.01); *H01M 4/525* (2013.01);
(Continued)

(58) Field of Classification Search
CPC ...... H01M 4/505; H01M 4/354; H01M 4/366; H01M 4/525; H01M 10/0525
See application file for complete search history.

(56) References Cited

U.S. PATENT DOCUMENTS 7,214,449 B2 * 5/2007 Sato ..................... H01M 4/131
429/218.1
8,900,753 B2 * 12/2014 Konishi ................ H01M 4/364
429/217

(Continued)

FOREIGN PATENT DOCUMENTS

EP 2672552 A2 12/2013
EP 2683004 A1 1/2014
(Continued)

OTHER PUBLICATIONS

European Search Report dated Mar. 31, 2016, issued in corresponding European Patent Application No. 15200031.1.

*Primary Examiner* — Ula C Ruddock
*Assistant Examiner* — Thomas H. Parsons
(74) *Attorney, Agent, or Firm* — Troutman Pepper Hamilton Sanders LLP

(57) ABSTRACT

A lithium ion secondary battery includes: a negative electrode having a carbon-based negative electrode material containing graphite particles and amorphous carbon particles; and a positive electrode including a lithium composite oxide. The lithium composite oxide is represented by a general formula: $Li_xNi_yMn_zCo_{(1-y-z)}O_2$, where x is a numeral of 1 or more and 1.2 or less, and y and z are positive numerals satisfying the relation of $y+z<1$. The lithium composite oxide has a layer crystal structure and has a median particle diameter (D50) of 4.0 μm or more and less than 6.0 μm.

12 Claims, 1 Drawing Sheet

(51) Int. Cl.
*H01M 4/525* (2010.01)
*H01M 4/587* (2010.01)
*H01M 10/0525* (2010.01)

(52) U.S. Cl.
CPC ....... *H01M 4/587* (2013.01); *H01M 10/0525* (2013.01); *H01M 2220/20* (2013.01)

(56) References Cited

U.S. PATENT DOCUMENTS

2009/0239143 A1* 9/2009 Miyazaki ............ H01M 4/131
429/188
2012/0258366 A1 10/2012 Yu et al.
2012/0270093 A1 10/2012 Isozaki et al.

FOREIGN PATENT DOCUMENTS

| EP | 2733776 A1 | | 5/2014 |
|----|------------|---|--------|
| JP | 2007220475 | * | 8/2007 |
| JP | 2007220475 A | * | 8/2007 |
| JP | 2011-054371 A | | 3/2011 |

\* cited by examiner

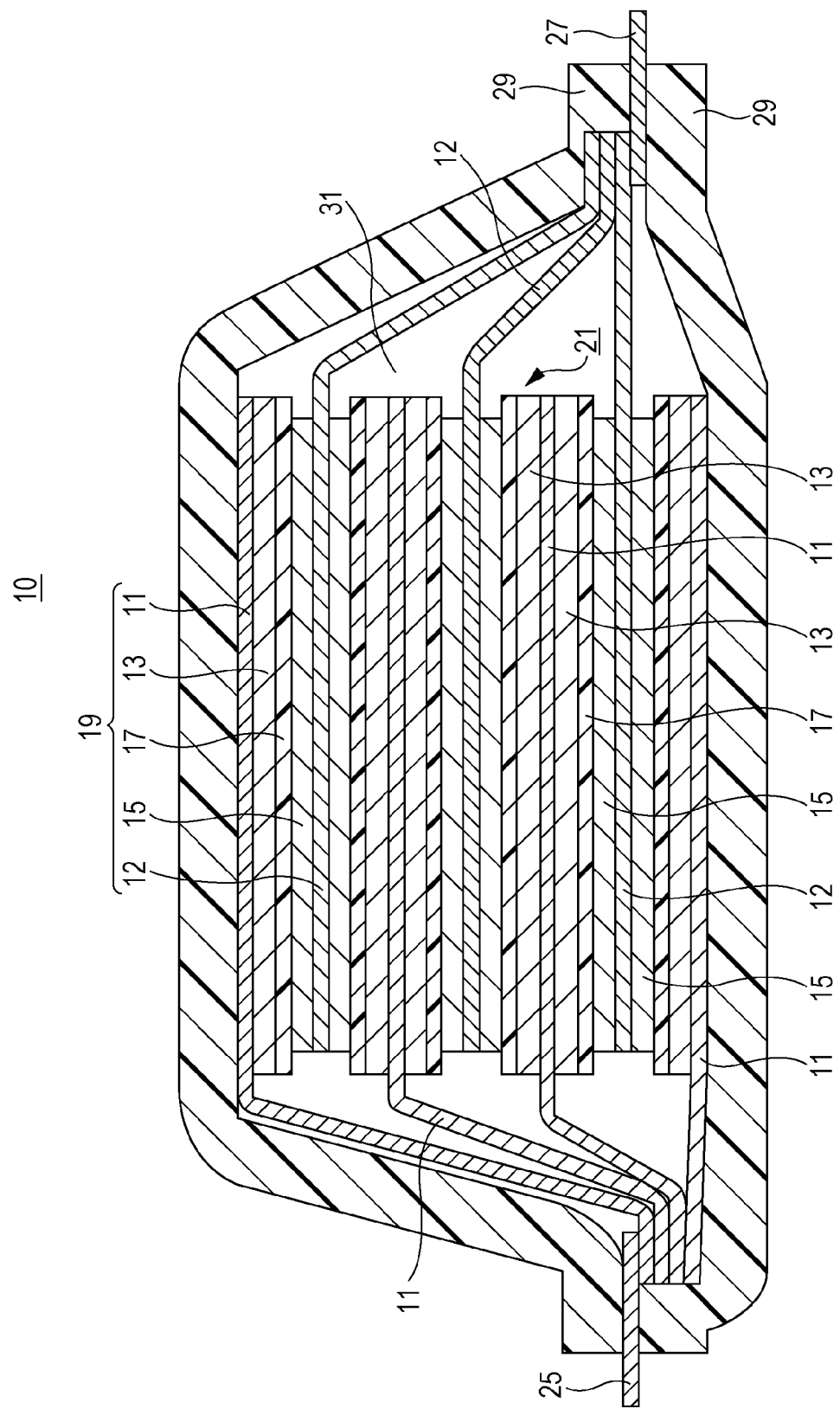

LITHIUM ION SECONDARY BATTERY

CROSS-REFERENCE TO RELATED APPLICATION

This application claims priority from Japanese Patent Application No. 2014-256331 filed with the Japan Patent Office on Dec. 18, 2014, the entire content of which is hereby incorporated by reference.

BACKGROUND

1. Technical Field

The present disclosure relates to a nonaqueous electrolyte battery, and more particularly to a lithium ion secondary battery.

2. Related Art

Nonaqueous electrolyte batteries have been put into practical use as batteries for vehicles including hybrid vehicles and electric vehicles. As such nonaqueous electrolyte batteries for the on-vehicle power source, lithium ion secondary batteries have been desired to have higher energy density, excellent input and output characteristics, and longer life. For improving the acceleration performance at the start of a vehicle, in particular, it is important to increase the output of the lithium ion secondary battery.

For improving the output characteristic of a lithium ion secondary battery, such a lithium ion secondary battery has been suggested that employs a material containing graphite and amorphous carbon mixed at a predetermined ratio as a negative electrode material for the lithium ion secondary battery. The lithium ion secondary battery includes a lithium composite oxide as a positive electrode material (JP-A-2011-54371). According to JP-A-2011-54371, the lower output at the end stage of the discharge can be suppressed because the graphite material can maintain higher battery voltage than the amorphous carbon material, and the battery can have a higher output characteristic by the use of the material obtained by mixing the graphite material and the amorphous carbon material. JP-A-2011-54371 discloses examples of the graphite material and the amorphous carbon material with the characteristics applicable to the mixed negative electrode material. JP-A-2011-54371 further discloses the use of a lithium nickel manganese cobalt composite oxide as the positive electrode active material.

Examination has been made on the use of the mixed negative electrode material known as the material with low electric resistance and the positive electrode material including a lithium nickel manganese cobalt composite oxide for a battery required to have a high output characteristic, such as a battery for a vehicle.

SUMMARY

A lithium ion secondary battery includes: a negative electrode including a carbon-based negative electrode material containing graphite particles and amorphous carbon particles; and a positive electrode including a lithium composite oxide. The lithium composite oxide is represented by a general formula: $Li_xNi_yMn_zCo_{(1-y-z)}O_2$, where x is a numeral of 1 or more and 1.2 or less, and y and z are positive numerals satisfying the relation of y+z<1. The lithium composite oxide has a layer crystal structure and has a median diameter (D50) of 4.0 μm or more and less than 6.0 μm.

BRIEF DESCRIPTION OF THE DRAWINGS

FIG. 1 is a schematic sectional view illustrating a lithium ion battery according to one embodiment of the present disclosure.

DETAILED DESCRIPTION

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the occurrence of short-circuiting in the battery including the material with low electric resistance, the large current can flow in the battery to generate heat. In view of this, an object of the present disclosure is to provide a lithium ion secondary battery which can effectively suppress the heat that would be generated in the occurrence of short-circuiting while the output characteristic of the battery is maintained.

The first embodiment of the present disclosure is a lithium ion secondary battery including: a negative electrode having a carbon-based negative electrode material containing graphite particles and amorphous carbon particles; and a positive electrode including a lithium composite oxide. The lithium composite oxide is represented by a general formula: $Li_xNi_yMn_zCo_{(1-y-z)}O_2$, where x is a numeral of 1 or more and 1.2 or less, and y and z are positive numerals satisfying the relation of y+z<1. The lithium composite oxide has a layer crystal structure and has a median particle diameter (D50) of 4.0 μm or more and less than 6.0 μm. The lithium ion secondary battery according to the first embodiment of the present disclosure includes the negative electrode including the carbon-based negative electrode material containing graphite particles and amorphous carbon particles, and the positive electrode including a lithium composite oxide. The lithium composite oxide is represented by a general formula: $Li_xNi_yMn_zCo_{(1-y-z)}O_2$ (where x is a numeral of 1 or more and 1.2 or less, and y and z are positive numerals satisfying the relation of y+z<1). This composite oxide has a layer crystal structure with a median particle diameter (D50) of 4.0 μm or more and less than 6.0 μm.

The negative electrode according to the first embodiment includes the carbon-based negative electrode material containing graphite particles and amorphous carbon particles. Graphite refers to a carbon material with a hexagonal crystal system with a hexagonal plate shape, which is also referred to as black lead or the like. The carbon-based negative electrode material according to the first embodiment may contain the graphite with shapes of particles.

A part of the structure of the amorphous carbon used in this embodiment may be similar to the structure of graphite. The amorphous carbon refers to a carbon material that is amorphous as a whole with a network structure including randomly distributed microcrystals. Examples of the amorphous carbon include carbon black, coke, activated carbon, carbon fiber, hard carbon, soft carbon, and mesoporous carbon. The amorphous carbon in the embodiment of the present disclosure may have shapes of particles.

The positive electrode according to this embodiment includes the lithium composite oxide. The lithium composite oxide is a lithium-nickel-manganese-cobalt composite oxide represented by a general formula: $Li_xNi_yMn_zCo_{(1-y-z)}O_2$, where x is a numeral of 1 or more and 1.2 or less, and y and z are positive numerals satisfying the relation of y+z<1. Containing more manganese makes it less easy to synthesize the composite oxide with a single phase. For this reason, the relation of z≤0.4 may be satisfied. Further, containing more cobalt leads to higher cost and lower capacity. For this reason, the relations of 1−y−z<y and 1−y−z<z may be satisfied. For obtaining the battery with high capacity, particularly, the relation of y>z and the relation of y>1−y−z may be satisfied. The lithium composite oxide according to this embodiment may have a layer crystal structure. The composite oxide may have a median particle diameter (D50) of 4.0 μm or more and less than 6.0 μm.

The lithium ion secondary battery according to the present disclosure includes a particular positive electrode active material having a particle diameter controlled to be within a predetermined range. Thus, the internal resistance of the electrode can be maintained within a predetermined range while the output characteristic of the battery is maintained. Accordingly, the heat that would be generated in the occurrence of the short-circuiting in the battery can be effectively suppressed without deteriorating the output characteristic of the battery.

Now, the first embodiment of the present disclosure is explained. A lithium ion secondary battery according to the first embodiment includes: a negative electrode having a carbon-based negative electrode material containing graphite particles and amorphous carbon particles; and a positive electrode including a lithium composite oxide. The lithium composite oxide is represented by a general formula: $Li_xNi_yMn_zCo_{(1-y-z)}O_2$, where x is a numeral of 1 or more and 1.2 or less, and y and z are positive numerals satisfying the relation of y+z<1. The lithium composite oxide has a layer crystal structure and has a median particle diameter (D50) of 4.0 μm or more and less than 6.0 μm. The lithium ion secondary battery according to the first embodiment of the present disclosure includes the negative electrode including the carbon-based negative electrode material containing graphite particles and amorphous carbon particles, and the positive electrode including a lithium composite oxide. The lithium composite oxide is represented by a general formula: $Li_xNi_yMn_zCo_{(1-y-z)}O_2$ (where x is a numeral of 1 or more and 1.2 or less, and y and z are positive numerals satisfying the relation of y+z<1). This composite oxide has a layer crystal structure with a median particle diameter (D50) of 4.0 μm or more and less than 6.0 μm.

In this embodiment, the positive electrode active material of the lithium ion secondary battery, which intercalates and deintercalates lithium ions along with the charging and discharging of the battery, may be a lithium composite oxide with a layer crystal structure. The lithium composite oxide has shapes of particles. The particles may have a median diameter of 4.0 μm or more and less than 6.0 μm. By controlling the median particle diameter of the lithium composite oxide within a predetermined range, the internal resistance of the battery can be maintained within a predetermined range. Accordingly, the heat that would be generated in the occurrence of the short-circuiting in the battery can be suppressed.

In this embodiment, the negative electrode material may be a mixture of graphite particles and amorphous carbon particles. The graphite particles and the amorphous carbon particles can be mixed by a normal method. For example, these particles can be weighed at a predetermined weight ratio and mixed with the use of a mechanical mixer typified by a ball mill or a mixer.

The second embodiment of the present disclosure is a lithium ion secondary battery including: a negative electrode having a carbon-based negative electrode material containing graphite particles and amorphous carbon particles; and a positive electrode including a lithium composite oxide. The lithium composite oxide is represented by a general formula: $Li_xNi_yMn_zCo_{(1-y-z)}O_2$, where x is a numeral of 1 or more and 1.2 or less, and y and z are positive numerals satisfying the relation of y+z<1. The lithium composite oxide has a layer crystal structure and a specific surface area of 0.6 m²/g or more and 1.1 m²/g or less. In other words, a lithium ion secondary battery according to the embodiments includes: a negative electrode including a carbon-based negative electrode material containing graphite particles and amorphous carbon particles; and a positive electrode including a lithium composite oxide. The lithium composite oxide is represented by a general formula: $Li_xNi_yMn_zCo_{(1-y-z)}O_2$, where x is a numeral of 1 or more and 1.2 or less, and y and z are positive numerals satisfying the relation of y+z<1. The lithium composite oxide has a layer crystal structure and a specific surface area of 0.6 m²/g or more and 1.1 m²/g or less.

In this embodiment, the positive electrode active material of the lithium ion secondary battery, which intercalates and deintercalates lithium ions along with the charging and discharging of the battery, may be a lithium composite oxide with a layer crystal structure. The lithium composite oxide may have shapes of particles. The particles may have a specific surface area of 0.6 m²/g or more and 1.1 m²/g or less. The specific surface area refers to the BET specific surface area measured by the BET method. As the particles have a larger specific surface area, the particles are smaller. By controlling the specific surface area of the lithium composite oxide to be within a predetermined range, the amount of current flowing in the positive electrode material can be maintained in a predetermined range. The speed of the chemical reaction per mass of the positive electrode active material is in proportion to the amount of current flowing in the positive electrode material. Therefore, the speed of the chemical reaction per mass of the positive electrode active material is maintained within the predetermined range for controlling the amount of current flowing in the positive electrode material in the particular range. The chemical reaction in the positive electrode active material is caused by the contact between the electrolyte solution and the positive electrode active material. Therefore, the speed of the chemical reaction in the positive electrode active material depends on the area (specific surface area) per unit weight of the positive electrode active material. For this reason, the amount of current flowing in the positive electrode material can be maintained within the predetermined range by controlling the specific surface area of the positive electrode active material in the predetermined range. Maintaining the amount of current flowing in the positive electrode material within the predetermined range is identical to maintaining the internal resistance of the battery within the predetermined range. This can suppress the heat that would be generated in the short-circuiting.

In this embodiment, the mixture of the graphite particles and the amorphous carbon particles can be used as the negative electrode material. On this occasion, the graphite particles and the amorphous carbon particles can be mixed by a normal method. For example, these particles can be weighed at a predetermined weight ratio and mixed with the use of a mechanical mixer typified by a ball mill or a mixer.

In the first and second embodiments, the ratio of the total surface area of the lithium composite oxide to the battery capacity may be 4.7 to 8.8 $m^2$/Ah. The total surface area of the lithium composite oxide is obtained by integrating the BET specific surface area measured based on the BET method and the weight of the lithium composite oxide. As described above, the chemical reaction in the positive electrode active material is caused by the contact between the electrolyte solution and the positive electrode active material. Therefore, the speed of the chemical reaction in the positive electrode active material depends on the area of the positive electrode active material. Controlling the ratio of the total surface area of the lithium composite oxide to the battery capacity to be within the above range is identical to controlling the speed of the reaction per specific capacity of the battery to be within the predetermined range. Accordingly, the thermal stability of the battery can be maintained and the output and input characteristic of the battery can be improved.

In the first and second embodiments, the ratio of y to z, y/z, in the general formula: $Li_xNi_yMn_zCo_{(1-y-z)}O_2$ representing the lithium composite oxide may be 1.70 or less. The crystal structure of the lithium composite oxide becomes more stable when the abundance ratio of nickel elements to manganese elements in the lithium composite oxide is a particular ratio. This improves the durability of the positive electrode material.

In the first and second embodiments, a lithium composite oxide mixture containing a lithium composite oxide represented by a general formula ($Li_xNi_{1/3}Mn_{1/3}Co_{1/3}O_2$) satisfying the relation of y:(1−y−z):z=1:1:1 and a lithium composite oxide represented by a general formula ($Li_xNi_{0.4}Mn_{0.3}Co_{0.3}O_2$) satisfying the relation of y:(1−y−z):z=4:3:3 can be used. The lithium composite oxide represented by the general formula satisfying the relation of y:(1−y−z):z=1:1:1 is generally referred to as "NCM111." The lithium composite oxide represented by the general formula satisfying the relation of y:(1−y−z):z=4:3:3 is generally referred to as "NCM433." In this specification, the lithium composite oxide represented by the general formula satisfying the relation of y:(1−y−z):z=1:1:1 is appropriately referred to as "NCM111." The lithium composite oxide represented by the general formula satisfying the relation of y:(1−y−z):z=4:3:3 is appropriately referred to as "NCM433." In NCM111, the ratio y/z is 1.0. In NCM433, the ratio y/z is 1.3. Therefore, any of these can be used alone as the positive electrode material. When the lithium composite oxide mixture obtained by mixing these is used, the crystal structure that is more appropriate can be formed. This results in the higher durability of the positive electrode active material. The mixing of the lithium composite oxides can be performed by a normal method. For example, these particles can be weighed at a predetermined weight ratio and mixed with the use of a mechanical mixer typified by a ball mill or a mixer.

In the first and second embodiments, the proportion of the graphite particles based on the weight of the carbon-based negative electrode material included in the negative electrode may be 50 wt. % or more, particularly 70 wt. % or more. In the negative electrode, both the graphite particles and the amorphous carbon particles expand and contract repeatedly in the charging and discharging cycle of the battery. The expansion of the graphite particles and the amorphous carbon particles produces the stress on the negative electrode layer, which may adversely affect the electrode layer. On the other hand, it is known that the amorphous carbon particles expand less easily than the graphite particles. In view of this, by the use of the mixed graphite particles and amorphous carbon particles, the stress on the electrode layer that would be generated by the expansion of the graphite particles can be relieved. If the weight proportion of amorphous carbon particles is too large, the battery voltage when the residual battery (State of Charge, hereinafter referred to as "SOC") is 50% or less is decreased, and this leads to a disadvantage of the lower battery output at the lower battery energy. Therefore, the weight proportion of the amorphous carbon particles may be 50% or less.

According to the first and second embodiments, a ratio of the median diameter (μm) of the graphite particles to a battery capacity (Ah) is 1.3 to 2.5 μm/Ah. A ratio of the specific surface area ($m^2$/g) of the graphite particles to the battery capacity (Ah) is 0.35 to 0.75 ($m^2$/g·Ah). A ratio of a median diameter (μm) of the amorphous carbon particles to the battery capacity (Ah) is 0.7 to 1.6 μm/Ah. A ratio of the specific surface area ($m^2$/g) of the amorphous carbon particles to the battery capacity (Ah) is 0.75 to 1.70 ($m^2$/g·Ah). Using the graphite particles and the amorphous carbon particles in combination enables the battery to have lower internal resistance. This can expand the application of the battery.

In the first and second embodiments, the surface of the lithium composite oxide may be coated. When the surface of the lithium composite oxide is coated, the specific surface area of the positive electrode active material is increased. This improves the affinity between the positive electrode active material and the electrolyte solution. Thus, the durability of the positive electrode is improved, which is advantageous. The material that coats the surface of the lithium composite oxide may be metal such as aluminum, aluminum oxide, or zirconium oxide, water-repellent resin such as polyvinylidene fluoride, or polymer with an arborescent structure such as STOBA (registered trademark) (Mitsui Chemicals, Inc.).

In the first and second embodiments, the lithium composite oxide may further contain a doping element. When the lithium composite oxide contains a doping element, the crystal structure of the lithium composite oxide is stabilized. This leads to the higher durability of the positive electrode, which is advantageous. The doping element may be, for example, a transition metal element such as zirconium, magnesium, titanium, aluminum, or iron, or boron.

In the first and second embodiments, the lithium composite oxide may further include a lithium manganese oxide with a spinel structure. When the lithium composite oxide includes a lithium manganese oxide with a lattice-shaped spinel structure, the positive electrode active material after the deintercalation of lithium ions in the charging has a more stable structure. This leads to the higher thermal stability of the positive electrode and the battery, which is advantageous.

According to the first and second embodiments, a negative electrode carbon material including the graphite particles and the amorphous carbon particles and the positive electrode active material including the lithium composite oxide are applied or rolled on a current collector such as a metal foil. The negative electrode active material and the positive electrode active material are then dried to form the negative electrode and the positive electrode, respectively. On this occasion, an addition that is normally used for forming an electrode, such as a binder, a conductive auxiliary agent, a thickener, a dispersant, or a stabilizer, can be used. The appropriate negative electrode and positive electrode can be formed in this manner.

In the first and second embodiments, the nonaqueous electrolyte solution can be employed. Examples of the nonaqueous electrolyte solution include a solution which is produced by one or more lithium salts selected from lithium hexafluorophosphate ($LiPF_6$), lithium tetrafluoroborate ($LiBF_4$), and lithium perchlorate ($LiClO_4$) being dissolved in a mixture solvent of one or more organic solvents selected from cyclic carbonates such as propylene carbonate and ethylene carbonate, and linear carbonates such as dimethyl carbonate, diethyl carbonate, and ethylmethyl carbonate.

In the first and second embodiments, a separator can be employed to secure conductivity of lithium ions between the separated negative electrode and positive electrode. The separator may be a porous film or a microporous film of polyolefins.

A structure example of the lithium ion battery according to the first and second embodiments is described with reference to a drawing. FIG. 1 is an example of a sectional view of a lithium ion battery. A lithium ion battery 10 includes a negative electrode current collector 11, a negative electrode active material layer 13, a separator 17, a positive electrode current collector 12, and a positive electrode active material layer 15 as main components. In FIG. 1, the negative electrode active material layer 13 is provided on each surface of the negative electrode current collector 11, and the positive electrode active material layer 15 is provided on each surface of the positive electrode current collector 12. The active material layer may alternatively be provided on just one surface of each current collector. The negative electrode current collector 11, the positive electrode current collector 12, the negative electrode active material layer 13, the positive electrode active material layer 15, and the separator 17 constitute one battery unit (unit cell 19 in the FIGURE). A plurality of unit cells 19 is stacked on each other with the separator 17 interposed therebetween. Extension portions extending from the negative electrode current collectors 11 are bonded onto a negative electrode lead 25 collectively. Extension portions extending from the positive electrode current collectors 12 are bonded onto a positive electrode lead 27 collectively. The battery formed by the stacked unit cells is packaged by an exterior body 29. At this time, the negative electrode lead 25 and the positive electrode lead 27 are led out of the exterior body 29. The inside of the exterior body 29 is filled with electrolyte solution 31.

EXAMPLES

Fabrication of Negative Electrode

As the negative electrode active material, the graphite powder with a median diameter of 9.3 μm and a specific surface area of 2.6 $m^2/g$ and the amorphous carbon powder with a median diameter of 5.5 μm and a specific surface area of 6.0 $m^2/g$ were mixed at 80:20 (weight ratio) and the negative electrode active material, which was obtained thereby, was used. The mixed materials, polyvinylidene fluoride as a binder, and carbon black powder as a conductive auxiliary agent were added to N-methyl-2-pyrrolidine (hereinafter referred to as "NMP") at a solid content mass ratio of 92:6:2. By stirring the obtained mixture, these materials were uniformly dispersed in NMP to prepare slurry. The obtained slurry was applied onto an 8-μm-thick copper foil, which would serve as a negative electrode current collector. Next, the slurry was heated for 10 minutes at 125° C. to evaporate NMP, thereby forming the negative electrode active material layer. In addition, the negative electrode active material layer was pressed, thereby fabricating the negative electrode with the negative electrode active material layer applied on one surface of the negative electrode current collector. This negative electrode was used in each of Examples 1 to 6 and Comparative Examples 1, 2, and 5.

The negative electrode containing the graphite powder with a median diameter of 9.3 μm and a specific surface area of 2.6 $m^2/g$ used alone as the negative electrode active material (Comparative Example 3) was fabricated. Moreover, the negative electrode containing the amorphous carbon powder with a median diameter of 5.5 μm and a specific surface area of 6.0 $m^2/g$ used alone as the negative electrode active material (Comparative Example 4) was fabricated.

Fabrication of Positive Electrode

The lithium composite oxide as the positive electrode active material, polyvinylidene fluoride as a binder resin, and carbon black powder as a conductive auxiliary agent were added to NMP as a solvent at a solid content mass ratio of 88:8: 4. Then, to 100 parts by mass of the solid content obtained by subtracting NMP from the mixture, 0.03 parts by mass of oxalic anhydride (molecular weight:90) as an organic moisture scavenger was added in the mixture. By stirring the obtained mixture, the materials were uniformly dispersed to prepare slurry. The obtained slurry was applied onto a 15-μm-thick aluminum foil, which would serve as a positive electrode current collector. Next, the slurry was heated for 10 minutes at 125° C. to evaporate NMP, thereby forming the positive electrode active material layer. In addition, the positive electrode active material layer was pressed, thereby fabricating the positive electrode with the positive electrode active material layer applied on one surface of the positive electrode current collector.

As shown in Table 1, the lithium composite oxide used in Examples 1 and 2 is NCM433 (the ratio x for lithium in the formula is approximately 1.05). The lithium composite oxide used in Example 3 is obtained by mixing the NCM433 and the lithium manganese oxide with a spinel structure at a weight ratio of 70:30. The lithium composite oxide used in Example 4 corresponds to a mixture of the lithium composite oxide obtained by mixing the NCM433 and the NCM111 (the ratio x for lithium in the formula is approximately 1.05) at a weight ratio of 70:30. In the preparation of the lithium composite oxide used in Example 5, first, 0.1 wt. % of aluminum particles were mixed in the lithium composite oxide mixture obtained by mixing the NCM433 and the NCM111 at a weight ratio of 70:30. Then, the obtained mixture was calcined at 450° C. to provide a coated lithium composite oxide mixture. This coated lithium composite oxide mixture was used as the lithium composite oxide. The lithium composite oxide used in Example 6 corresponds to a zirconium-doped lithium composite oxide mixture obtained by mixing 0.1 mol % of zirconium particles to the lithium composite oxide mixture obtained by mixing the NCM433 and the NCM111 at a weight ratio of 70:30. With the use of the lithium composite oxide, the positive electrode was fabricated.

Fabrication of Lithium Ion Secondary Battery

A plurality of negative electrodes and a plurality of positive electrodes were cut out of the negative electrodes and the positive electrodes fabricated as above. An uncoated portion used for connecting a terminal was welded using ultrasonic waves to a positive electrode terminal made of aluminum. Similarly, an uncoated portion of the negative electrode was welded using ultrasonic waves to a negative electrode terminal made of nickel, which has the same size as the positive electrode terminal. The negative electrode was disposed on one surface of the separator made of polypropylene and the positive electrode was disposed on the other surface thereof, in a manner that the negative electrode active material layer and the positive electrode active material layer were stacked with the separator interposed therebetween. This provides the electrode multilayer body. Three sides of the two aluminum laminated films, except one long side thereof, were attached to each other by thermal sealing. This produced a bag-shaped laminated exterior body. The electrode multilayer body was inserted into the laminated exterior body. The nonaqueous electrolyte solution was poured so that the body was impregnated with the electrolyte solution in vacuum. After that, the opening was sealed thermally under reduced pressure, thereby providing a stacked lithium ion battery. By performing the high-temperature aging on the stacked lithium ion battery several times, a stacked lithium ion battery with a battery capacity of 5 Ah was obtained.

For preparing the nonaqueous electrolyte solution, first, a nonaqueous solvent was obtained by mixing propylene carbonate (hereinafter referred to as "PC"), ethylene carbonate (hereinafter referred to as "EC"), and diethyl carbonate (hereinafter referred to as "DEC") at a ratio of PC:EC:DEC=5:25:70 (volume ratio). Lithium hexafluorophosphate ($LiPF_6$) as the electrolyte salt was dissolved in this nonaqueous solvent so that the concentration became 0.9 mol/L, thereby providing the nonaqueous solution. To this nonaqueous solution, linear disulfonate (methylene methane disulfonate (MMDS)) and vinylene carbonate as addition were dissolved so that the concentration became 1 wt. %, thereby providing the nonaqueous electrolyte solution for batteries.

Measurement of Initial Performance of Lithium Ion Battery

The stacked lithium ion battery fabricated as above was charged and discharged for one cycle under the condition of a temperature of 25° C., CCCV charging (two hours) until an end-of-charge voltage of 4.2 V and discharging until an end-of-discharge voltage of 3.0 V. From this charging and discharging cycle, the charging capacity and discharging capacity were calculated. The ratio between the charging capacity and the discharging capacity was obtained as the initial charging and discharging efficiency. The battery with a residual battery (hereinafter referred to as "SOC") of 50% was discharged at a constant current of 10 A for five seconds. Consequently, the initial battery resistance of this battery was measured. Table shows the values of the initial battery resistance in Examples expressed in percentage, as compared to the value of the initial battery resistance according to Example 1 assumed as 100%.

Cycle Characteristic Test

The stacked lithium ion battery fabricated as above was charged and discharged repeatedly at 1-C current with a battery voltage between 4.2 V and 3 V under the environment of 55° C. for a month. The capacity retention was calculated by a formula (battery capacity after 1-month cycle)/(initial battery capacity).

Measurement of Voltage Drop Amount of Lithium Ion Battery

The stacked lithium ion battery fabricated as above was charged to 4.2 V and the voltage thereof was measured with a voltage meter. Next, a nail with a diameter of φ=3 mm was penetrated through the battery at a speed of 80 mm/s After five minutes of the penetration, the voltage of the battery was measured again. The voltage drop amount was calculated by (battery voltage before the penetration)—(battery voltage after the penetration) (V).

Examples 1 to 6, and Comparative Examples 1 to 5

The results of evaluating the characteristics of the stacked lithium ion battery fabricated as above are shown in Table 1.

TABLE 1

| | | Positive electrode | | | | Evaluation | | |
|---|---|---|---|---|---|---|---|---|
| | Material | D50 particle size (μm) | Specific surface area ($m^2$/g) | Ni/Mn ratio | Surface area/battery capacity ($m^2$/Ah) | Battery resistance (%) | Voltage drop amount (V) | Capacity retention (%) |
| Example 1 | NCM433 | 5.5 | 0.6 | 1.3 | 4.4 | 100 | 0.1 | 77 |
| Example 2 | NCM433 | 4.0 | 1.1 | 1.3 | 8.0 | 73 | 0.1 | 77 |
| Example 3 | NCM433 + spinel lithium manganese oxide | 4.0 | 1.1 | 1.3 | 8.0 | 80 | 0.1 | 77 |
| Example 4 | NCM433 + NCM111 | 4.0 | 1.1 | 1.2 | 8.0 | 76 | 0.1 | 83 |
| Example 5 | NCM433 + NCM111, coated with aluminum | 4.0 | 1.1 | 1.2 | 8.0 | 73 | 0.1 | 85 |
| Example 6 | NCM433 + NCM111, doped with zirconium | 4.0 | 1.1 | 1.2 | 8.0 | 75 | 0.1 | 85 |
| Comparative Example 1 | NCM433 | 3.9 | 1.3 | 1.3 | 9.5 | 64 | 4.1 | 77 |
| Comparative Example 2 | NCM433 | 6.0 | 0.5 | 1.3 | 3.6 | 136 | 0.1 | 76 |
| Comparative Example 3* | NCM433 | 4.5 | 1.1 | 1.3 | 8.0 | 73 | 4.1 | 75 |
| Comparative Example 4** | NCM433 | 4.5 | 1.1 | 1.3 | 8.0 | 73 | 4.1 | 77 |

TABLE 1-continued

| | | Positive electrode | | | | Evaluation | | |
|---|---|---|---|---|---|---|---|---|
| | Material | D50 particle size (μm) | Specific surface area (m²/g) | Ni/Mn ratio | Surface area/battery capacity (m²/Ah) | Battery resistance (%) | Voltage drop amount (V) | Capacity retention (%) |
| Comparative Example 5 | NCM622 | 5.5 | 0.6 | 3.0 | 4.4 | 100 | 4.1 | 75 |

*containing graphite powder by 100% as negative electrode carbon material
**containing amorphous carbon powder by 100% as negative electrode carbon material The lithium ion secondary battery according to the present disclosure has low resistance and the voltage drop amount thereof according to the nail penetration test is small. When the battery has too low resistance, the heat may be generated in the occurrence of short-circuiting due to the nail. Despite the relatively low internal resistance, however, the voltage drop amount is small in the lithium ion secondary battery according to the present disclosure. The capacity retention after 1-month cycle test was improved because the lithium composite oxide mixture of the NCM433 and the NCM111 was used as the lithium composite oxide for the positive electrode material, and moreover because the surface was coated with aluminum or doping with the zirconium elements was conducted (Examples 4 to 6). It is understood that the lithium ion secondary battery according to the present disclosure has high safety and excellent battery durability.

The description has been made of Examples of the present disclosure but the above Examples merely illustrate examples of the embodiment according to the present disclosure. The technical range of the present disclosure is not limited by the specific structure of the embodiment illustrated in the above Examples.

The lithium ion secondary battery according to the embodiment of the present disclosure may be any of the following first to ninth lithium ion secondary batteries.

The first lithium ion secondary battery is a lithium ion secondary battery including at least: a negative electrode including a carbon-based negative electrode material containing graphite particles and amorphous carbon particles; and a positive electrode including a lithium composite oxide represented by a general formula $Li_xNi_yMn_zCo_{(1-y-z)}O_2$ (x is a numeral of 1 or more and 1.2 or less, and y and z are positive numerals satisfying the relation of y+z<1). The lithium composite oxide has a layer crystal structure and has a median particle diameter (D50) of 4.0 μm or more and less than 6.0 μm.

The second lithium ion secondary battery is a lithium ion secondary battery including at least: a negative electrode including a carbon-based negative electrode material containing graphite particles and amorphous carbon particles; and a positive electrode including a lithium composite oxide represented by a general formula $Li_xNi_yMn_zCo_{(1-y-z)}O_2$ (x is a numeral of 1 or more and 1.2 or less, and y and z are positive numerals satisfying the relation of y+z<1). The lithium composite oxide has a layer crystal structure and a specific surface area of 0.6 m²/g or more and 1.1 m²/g or less.

In the third lithium ion secondary battery according to the first or second lithium ion secondary battery, the ratio of the total surface area of the lithium composite oxide to battery capacity is 4.7 to 8.8 m²/Ah.

In the fourth lithium ion secondary battery according to any of the first to third lithium ion secondary batteries, the ratio y/z in the lithium composite oxide is 1.70 or less.

In the fifth lithium ion secondary battery according to any of the first to fourth lithium ion secondary batteries, the lithium composite oxide is a lithium composite oxide mixture including at least a lithium composite oxide with y:(1−y−z):z=1:1:1 and a lithium composite oxide with y:(1−y−z):z=4:3:3.

In the sixth lithium ion secondary battery according to any of the first to fifth lithium ion secondary batteries, the weight proportion of the graphite included in the negative electrode is 50% or more based on the weight of the carbon-based negative electrode material.

In the seventh lithium ion secondary battery according to any of the first to sixth lithium ion secondary batteries, the surface of the lithium composite oxide is coated.

In the eighth lithium ion secondary battery according to any of the first to seventh lithium ion secondary batteries, the lithium composite oxide further includes a doping element.

In the ninth lithium ion secondary battery according to any of the first to eighth lithium ion secondary batteries, the lithium composite oxide further includes a lithium manganese oxide with a spinel structure.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:
1. A lithium ion secondary battery comprising:
  a negative electrode including a carbon-based negative electrode material containing graphite particles and amorphous carbon particles; and
  a positive electrode including a mixture of a first lithium composite oxide and a second lithium composite oxide, wherein:
  the first and the second lithium composite oxides are represented by a general formula: $Li_xNi_yMn_zCo_{(1-y-z)}O_2$, where x is a numeral of 1 or more and 1.2 or less, and y and z are positive numerals satisfying the relation of y+z<1; and
  the mixture of the lithium composite oxides has a layer crystal structure comprising:
    a median particle diameter (D50) of 4.0 pm or more and does not exceed 5.5 pm,
    and
    a specific surface area of 0.6 m²/g or more and 1.1 m²/g or less, and wherein a ratio y/z in the general formula representing the mixture of the lithium composite oxides is 1.70 or less.

2. The lithium ion secondary battery according to claim 1, wherein a ratio of a total surface area of the mixture of the lithium composite oxides to a battery capacity is 4.7 to 8.8 m²/Ah.

3. The lithium ion secondary battery according to claim 1, wherein the-first lithium composite oxide is represented by a general formula $Li_xNi_{1/3}Mn_{1/3}Co_{1/3}O_2$ and the second lithium composite oxide is represented by a general formula $Li_xNi_{0.4}Mn_{0.3}Co_{0.3}O_2$.

4. The lithium ion secondary battery according to claim 1, wherein a weight proportion of the graphite particles included in the negative electrode is 50% or more based on the weight of the carbon-based negative electrode material.

5. The lithium ion secondary battery according to claim 1, wherein a surface of the mixture of the lithium composite oxides is coated.

6. The lithium ion secondary battery according to claim 1, wherein the mixture of the lithium composite oxides further includes a doping element.

7. The lithium ion secondary battery according to claim 1, wherein the mixture of the lithium composite oxides further includes a lithium manganese oxide with a spinel structure.

8. A lithium ion secondary battery comprising:
a negative electrode including a carbon-based negative electrode material containing graphite particles and amorphous carbon particles; and
a positive electrode including a mixture of a first lithium composite oxide and a second lithium composite oxide, wherein:
the first and the second lithium composite oxides are represented by a general formula: $Li_xNi_yMn_zCo_{(1-y-z)}O_2$, where x is a numeral of 1 or more and 1.2 or less, and y and z are positive numerals satisfying the relation of y+z<1; and
the mixture of the lithium composite oxides has a layer crystal structure comprising:
a median particle diameter (D50) of 4.0 μm or more and does not exceed 5.5 μm, and
a specific surface area of 0.6 m²/g or more and 1.1 m²/g or less,
wherein a ratio of a total surface area of the mixture of the lithium composite oxides to a battery capacity is 4.7 to 8.8 m²/Ah, and
wherein a ratio y/z in the general formula representing the mixture of the lithium composite oxides is 1.70 or less.

9. A lithium ion secondary battery comprising:
a negative electrode including a carbon-based negative electrode material containing graphite particles and amorphous carbon particles; and
a positive electrode including a mixture of a first lithium composite oxide and a second lithium composite oxide,
a separator between the negative electrode and the positive electrode,
wherein:
the first and the second lithium composite oxides are represented by a general formula: $Li_xNi_yMn_zCo_{(1-y-z)}O_2$, where x is a numeral of 1 or more and 1.2 or less, and y and z are positive numerals satisfying the relation of y+z<1; and
the mixture of the lithium composite oxides has a layer crystal structure comprising:
a median particle diameter (D50) of 4.0 pm or more and does not exceed 5.5 pm, and
a specific surface area of 0.6 m²/g or more and 1.1 m²/g or less, and
wherein a ratio y/z in the general formula representing the mixture of the lithium composite oxides is 1.70 or less.

10. The method of claim 9, wherein the separator is a porous film.

11. The method of claim 9, wherein the separator is a microporous film of polyolefins.

12. The method of claim 9, wherein a ratio of a total surface area of the mixture of the lithium composite oxides to a battery capacity is 4.7 to 8.8 m2/Ah.

* * * * *